(12) United States Patent
Allermann

(10) Patent No.: US 7,153,571 B2
(45) Date of Patent: Dec. 26, 2006

(54) SILANE CROSSLINKABLE POLYETHYLENE

(75) Inventor: Gerd Arthur Allermann, Overijse (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 277 days.

(21) Appl. No.: 10/626,976

(22) Filed: Jul. 25, 2003

(65) Prior Publication Data

US 2004/0024138 A1 Feb. 5, 2004

Related U.S. Application Data

(60) Provisional application No. 60/400,160, filed on Aug. 1, 2002, provisional application No. 60/400,242, filed on Jul. 31, 2002.

(51) Int. Cl.
*B32B 25/20* (2006.01)
(52) U.S. Cl. .................. 428/391; 428/405; 525/288
(58) Field of Classification Search ............. 525/288; 428/391, 405
See application file for complete search history.

(56) References Cited

U.S. PATENT DOCUMENTS

| | | | |
|---|---|---|---|
| 4,243,619 A | 1/1981 | Fraser et al. | |
| 4,540,753 A | 9/1985 | Cozewith et al. | |
| 4,543,399 A | 9/1985 | Jenkins, III et al. | |
| 4,588,790 A | 5/1986 | Jenkins, III et al. | |
| 4,892,851 A | 1/1990 | Ewen et al. | |
| 5,026,798 A | 6/1991 | Canich | |
| 5,055,438 A | 10/1991 | Canich | |
| 5,057,475 A | 10/1991 | Canich et al. | |
| 5,153,157 A | 10/1992 | Hlatky et al. | |
| 5,206,075 A | 4/1993 | Hodgson, Jr. | |
| 5,241,025 A | 8/1993 | Hlatky et al. | |
| 5,264,405 A | 11/1993 | Canich | |
| 5,334,677 A | 8/1994 | Razavi et al. | |
| 5,350,723 A | 9/1994 | Neithamer et al. | |
| 5,352,749 A | 10/1994 | DeChellis et al. | |
| 5,405,922 A | 4/1995 | DeChellis et al. | |
| 5,416,228 A | 5/1995 | Ewen et al. | |
| 5,436,304 A | 7/1995 | Griffin et al. | |
| 5,449,651 A | 9/1995 | Reddy et al. | |
| 5,462,999 A | 10/1995 | Griffin et al. | |
| 5,763,543 A | 6/1998 | Muhle et al. | |
| 5,932,659 A | 8/1999 | Bambara et al. ............ 525/240 |
| 6,218,484 B1 | 4/2001 | Brown et al. | |
| 6,255,426 B1 | 7/2001 | Lue et al. .................. 526/348 |
| 6,281,288 B1 * | 8/2001 | Bickert et al. ................. 525/72 |
| 6,316,512 B1 | 11/2001 | Bambara et al. ............ 521/144 |
| 6,350,512 B1 | 2/2002 | Hurley et al. ............ 428/317.3 |

FOREIGN PATENT DOCUMENTS

| | | |
|---|---|---|
| EP | 277 004 | 8/1988 |
| EP | 426 638 | 5/1991 |
| EP | 427 697 | 5/1991 |
| EP | 495 375 | 7/1992 |
| EP | 500 944 | 9/1992 |
| EP | 520 732 | 12/1992 |
| EP | 570 982 | 11/1993 |
| EP | 612 768 | 8/1994 |
| WO | WO 91/09882 | 7/1991 |
| WO | WO 93/03093 | 2/1993 |
| WO | WO 93/14132 | 7/1993 |
| WO | WO 94/03506 | 2/1994 |
| WO | WO 96/02244 | 2/1996 |
| WO | WO 96/08520 | 3/1996 |
| WO | WO 98/56012 | 12/1998 |

OTHER PUBLICATIONS

L. Wild et al., "*Determination of Branching Distributions in Polyethylene and Ethylene Copolymers*," Journal of Polymer Science, vol. 20, pp. 441-455, 1982.
G. Ver Strate et al., "*Near monodisperse Ethylene-Propylene Copolymers by Direct Ziegler-Natta Polymerization. Preparation, Characterization, Properties*," Macromolecules, vol. 21, pp. 3360-3371, 1988.
Ouano, A.c., "*Gel Permeation Chromatography*," Chapter 6, Marcel Dekker, Inc., NY, pp. 287-368, 1975.
Rodriguez, F., "*Principles of Polymer Systems 3rd ed.*," Hemisphere Pub Corp., NY, pp. 155-160, 1989.
J.A. Ewen et al., "*Syndiospecific Propylene polymerizations with Group 4 Metallocenes*," J. Am. Chem. Soc., No. 110, pp. 6255-6256, 1988.

* cited by examiner

*Primary Examiner*—Bernard Lipman

(57) ABSTRACT

Crosslinkable or crosslinked polymer compositions are provided, the compositions including a copolymer of ethylene and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm³, a melt index ratio $I_{21.6}/I_{2.16}$ of from 30 to 80, and an Mw/Mn ratio of from 2.5 to 5.5; and a silane grafting composition including a silane compound and a free radical initiator; or reaction products thereof. The crosslinkable or crosslinked compositions are particularly suitable for electrical applications, such as in insulating, semiconducting or jacketing layers of power cables, telecommunications cables, and combined power/telecommunications cables.

48 Claims, 6 Drawing Sheets

SILANE CROSSLINKABLE POLYETHYLENE

1. CROSS-REFERENCE TO RELATED APPLICATIONS

The present application claims the benefit of U.S. Provisional Application Nos. 60/400,242, filed Jul. 31, 2002, and 60/400,160, filed Aug. 1, 2002, both applications incorporated herein by reference.

2. FIELD OF THE INVENTION

The present invention is directed generally to crosslinkable or crosslinked polymers. More particularly, the invention provides compositions including a silane crosslinkable or crosslinked metallocene-catalyzed polyethylene copolymer, and electrical devices including such compositions, particularly as one or more electrically insulating layers, semiconducting layers, or jacketing layers, in a power cable, a telecommunications cable, or a combined power/telecommunications cable.

3. BACKGROUND

A variety of polymeric materials are used in insulating, semiconducting and jacketing layer of electrical devices. In particular, low density polyethylene (LDPE) produced by high pressure free radical polymerization, and linear low density polyethylene (LLDPE) produced by Ziegler-Natta-catalyzed polymerization, are widely used. These materials are typically crosslinked to improve various properties such as mechanical strength, processability, and resistance to high temperature degradation.

Crosslinked LDPE offers a number of advantages over crosslinked LLDPE. In particular, LDPE has better processability characteristics, such as lower melt fracture, higher melt strength, and reduced torque requirements in extrusion. The electrical properties of LDPE insulators are also superior to those of LLDPE-based insulators, since the LDPE resin includes no residual, conductive catalyst. Despite the processability disadvantages of Ziegler-Natta LLDPE, LLDPE is widely used in electrical applications, due to significant advantages in mechanical strength both before and after aging, in crosslinking speed, and in overall improved cost/performance balance.

There remains a need in the art for crosslinkable and crosslinked polymer compositions which combine the processability advantages of LDPE and the mechanical strength and crosslinking speed of Ziegler-Natta LLDPE.

4. SUMMARY OF THE INVENTION

In one embodiment, the invention provides a polymer composition, the composition including: a copolymer of ethylene and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5; and a silane grafting composition; or the reaction product or products thereof. The silane grafting composition includes a free radical initiator and a silane compound having an unsaturated group capable of grafting to the ethylene copolymer and one or more hydrolyzable group capable of undergoing a condensation crosslinking reaction. The polymer composition is particularly suitable for use in electrical devices.

In another embodiment, the invention provides a silane crosslinked polymer composition, the composition including the reaction product of (a) a copolymer of ethylene and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5; (b) a silane grafting composition including a free radical initiator and a silane compound having an unsaturated group capable of grafting to the ethylene copolymer and one or more hydrolyzable group capable of undergoing a condensation crosslinking reaction; and (c) a silanol condensation catalyst. The polymer composition is particularly suitable for use in electrical devices.

In other embodiments, the invention provides electrical devices including any of the crosslinkable or crosslinked polymer compositions described herein. The crosslinkable or crosslinked polymer compositions can form or be a component of an insulating layer, a semiconducting layer, jacketing layer, or more than one such layers, of the device. In specific aspects of this embodiment, the electrical device can be a low, medium or high voltage power cable, a telecommunications cable, or a combined power/telecommunications cable.

5. BRIEF DESCRIPTION OF THE DRAWINGS

6. DETAILED DESCRIPTION

6.1 Polyethylene Resins

Figure 1:
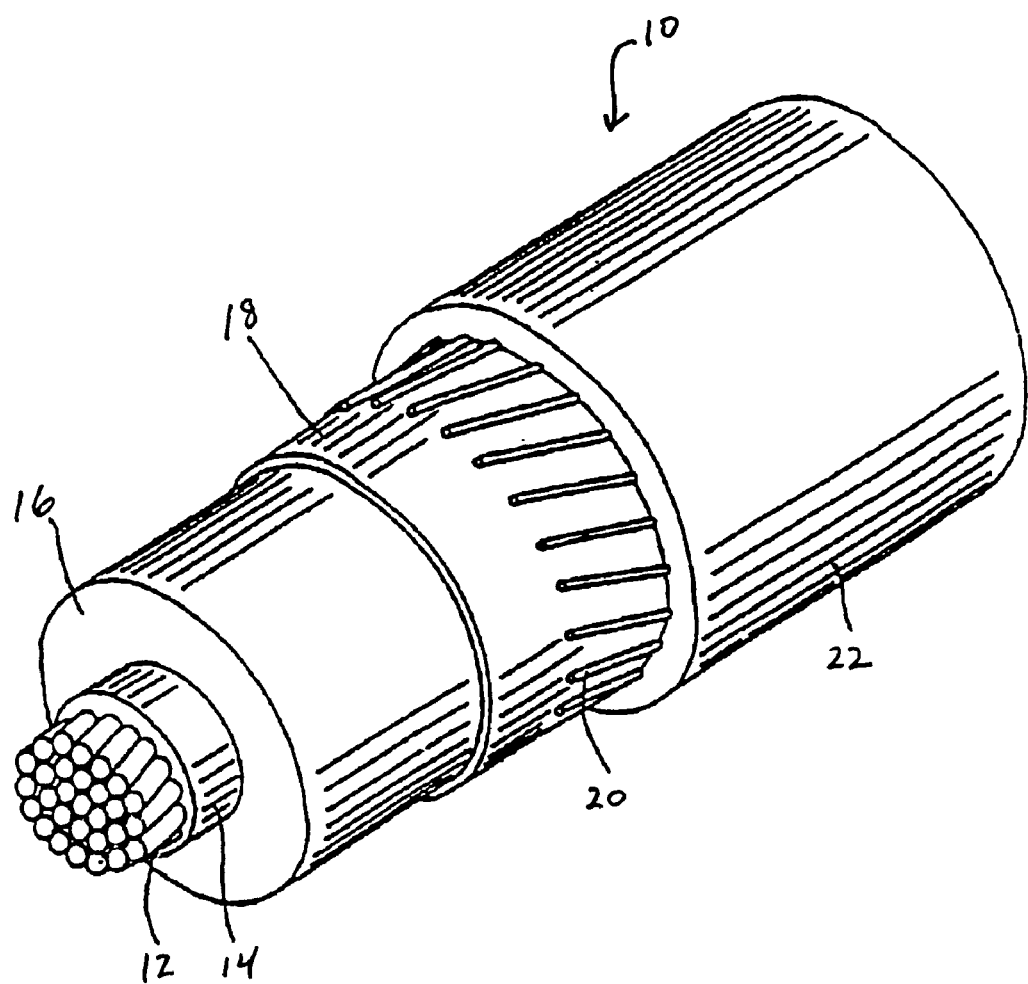
FIG. 1 is a perspective view of an electrical device according to an embodiment of the invention.

Polyethylene resins suitable for the compositions described herein are copolymers of ethylene and at least one comonomer. Polymers having more than two types of monomers, such as terpolymers, are also included within the term "copolymer" as used herein. As used herein, the term "ethylene copolymer" indicates a polymer formed of more than 50 mol % polymerized ethylene units, and the remaining less than 50 mol % polymerized units being polymerized α-olefin comonomers, such as $C_3$–$C_{20}$ α-olefins or $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers can include polar vinyl, conjugated and non-conjugated dienes, acetylene and aldehyde monomers, which can be included in minor amounts in terpolymer compositions. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the polyethylene polymer and the specific comonomers selected. For a given comonomer, the density of the polyethylene polymer produced therefrom decreases as the comonomer content increases. One skilled in the art can readily determine the appropriate comonomer content appropriate to produce a copolymer having a desired density.

In general, suitable polyethylene resins can be produced using a gas-phase metallocene-catalyzed polymerization process in a fluidized-bed reactor. Further details of the catalysts and process are given below.

The polyethylene resins suitable for use in the compositions of the present invention are described more fully in U.S. Pat. No. 6,255,426.

Suitable polyethylene resins can have one or more of the following properties, with ranges from any lower limit to any upper limit being contemplated:
(a) a composition distribution breadth index ("CDBI") of at least 70% or at least 75% or at least 80%;
(b) a melt index $I_{2.16}$ of from a lower limit of 0.1 or 0.3 to an upper limit of 10 or 15 g/10 min.;
(c) a density of from a lower limit of 0.910 or 0.916 or 0.918 to an upper limit of 0.940 or 0.935 or 0.930 or 0.927 g/cm$^3$;
(d) a melt index ratio $I_{21.6}/I_{2.16}$ of from a lower limit of 30 or 35 to an upper limit of 80 or 60; and
(e) an Mw/Mn ratio of from a lower limit of 2.5 or 2.8 or 3.0 or 3.2 to an upper limit of 5.5 or 4.5 or 4.0 or 3.8.

Preferred embodiments have all of the characteristics (a)–(e), with any of the combinations of lower and/or upper limits recited. Thus, for example, in one embodiment, the polyethylene resin has a CDBI of at least 70%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5.

In another embodiment, the polyethylene resin has a CDBI of at least 75%, a melt index $I_{2.16}$ of from 0.1 to 15 g/10 min, a density of from 0.910 to 0.940 g/cm3, a melt index ratio $I_{21.6}/I_{2.16}$ of from 30 to 80, and an Mw/Mn ratio of from 2.5 to 5.5.

In another embodiment, the polyethylene resin has a CDBI of at least 80%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5.

In another embodiment, the polyethylene resin has the properties of any of the embodiments above, except that the melt index $I_{2.16}$ is of from 0.1 to 10 g/10 min.

In another embodiment, the polyethylene resin has the properties of any of the embodiments above, except that the melt index $I_{2.16}$ is of from 0.3 to 15 g/10 min.

In another embodiment, the polyethylene resin has the properties of any of the embodiments above, except that the melt index $I_{2.16}$ is of from 0.3 to 10 g/10 min.

In another embodiment, the polyethylene resin has the properties of any of the embodiments above, except that the density is from 0.910 to 0.935 g/cm$^3$.

In another embodiment, the polyethylene resin has the properties of any of the embodiments above, except that the density is from 0.910 to 0.930 g/cm$^3$.

In another embodiment, the polyethylene resin has the properties of any of the embodiments above, except that the density is from 0.910 to 0.927 g/cm$^3$.

In another embodiment, the polyethylene resin has the properties of any of the embodiments above, except that the density is from 0.916 to 0.940 g/cm$^3$.

In another embodiment, the polyethylene resin has the properties of any of the embodiments above, except that the density is from 0.916 to 0.935 g/cm$^3$.

In another embodiment, the polyethylene resin has the properties of any of the embodiments above, except that the density is from 0.916 to 0.930 g/cm$^3$.

In another embodiment, the polyethylene resin has the properties of any of the embodiments above, except that the density is from 0.916 to 0.927 g/cm$^3$.

In another embodiment, the polyethylene resin has the properties of any of the embodiments above, except that the density is from 0.918 to 0.940 g/cm$^3$.

In another embodiment, the polyethylene resin has the properties of any of the embodiments above, except that the density is from 0.918 to 0.935 g/cm$^3$.

In another embodiment, the polyethylene resin has the properties of any of the embodiments above, except that the density is from 0.918 to 0.930 g/cm$^3$.

In another embodiment, the polyethylene resin has the properties of any of the embodiments above, except that the density is from 0.918 to 0.927 g/cm$^3$.

In another embodiment, the polyethylene resin has the properties of any of the embodiments above, except that the melt index ratio $I_{21.6}/I_{2.16}$ is from 30 to 60.

In another embodiment, the polyethylene resin has the properties of any of the embodiments above, except that the melt index ratio $I_{21.6}/I_{2.16}$ is from 35 to 80.

In another embodiment, the polyethylene resin has the properties of any of the embodiments above, except that the melt index ratio $I_{21.6}/I_{2.16}$ is from 35 to 60.

In another embodiment, the polyethylene resin has the properties of any of the embodiments above, except that the Mw/Mn ratio is from 2.5 to 4.5.

In another embodiment, the polyethylene resin has the properties of any of the embodiments above, except that the Mw/Mn ratio is from 2.5 to 4.0.

In another embodiment, the polyethylene resin has the properties of any of the embodiments above, except that the Mw/Mn ratio is from 2.5 to 3.8.

In another embodiment, the polyethylene resin has the properties of any of the embodiments above, except that the Mw/Mn ratio is from 2.8 to 5.0.

In another embodiment, the polyethylene resin has the properties of any of the embodiments above, except that the Mw/Mn ratio is from 2.8 to 4.5.

In another embodiment, the polyethylene resin has the properties of any of the embodiments above, except that the Mw/Mn ratio is from 2.8 to 4.0.

In another embodiment, the polyethylene resin has the properties of any of the embodiments above, except that the Mw/Mn ratio is from 2.8 to 3.8.

In another embodiment, the polyethylene resin has the properties of any of the embodiments above, except that the Mw/Mn ratio is from 3.0 to 5.5.

In another embodiment, the polyethylene resin has the properties of any of the embodiments above, except that the Mw/Mn ratio is from 3.0 to 4.5.

In another embodiment, the polyethylene resin has the properties of any of the embodiments above, except that the Mw/Mn ratio is from 3.0 to 4.0.

In another embodiment, the polyethylene resin has the properties of any of the embodiments above, except that the Mw/Mn ratio is from 3.0 to 3.8.

In another embodiment, the polyethylene resin has the properties of any of the embodiments above, except that the Mw/Mn ratio is from 3.2 to 5.5.

In another embodiment, the polyethylene resin has the properties of any of the embodiments above, except that the Mw/Mn ratio is from 3.2 to 4.5.

In another embodiment, the polyethylene resin has the properties of any of the embodiments above, except that the Mw/Mn ratio is from 3.2 to 4.0.

In another embodiment, the polyethylene resin has the properties of any of the embodiments above, except that the Mw/Mn ratio is from 3.2 to 3.8.

In addition to the properties recited above, the polyethylene resins can be characterized in terms of their properties in monolayer films. Such properties do not limit the polyethylene resins to monolayer film applications, but provide a further means of distinguishing the resins from other resins that may have similar bulk resin properties, but more subtle and significant distinctions evident in monolayer films formed from the resins.

Thus, in another embodiment, the polyethylene resin according to any of the above embodiments is further characterized in that a monolayer film formed from the resin has a Haze value of less than 20%, as measured according to ASTM D-1003-95.

In another embodiment, the polyethylene resin according to any of the above embodiments is further characterized in that a monolayer film formed from the resin has a Haze value of less than 15%, as measured according to ASTM D-1003-95.

In another embodiment, the polyethylene resin according to any of the above embodiments is further characterized in that a monolayer film formed from the resin has an Averaged Modulus M of from 20000 psi (14000 N/cm$^2$) to 60000 psi (41000 N/cm$^2$), where M is the arithmetic mean of the machine direction and transverse direction 1% secant moduli as determined according to ASTM D-882-97.

In another embodiment, the polyethylene resin according to any of the above embodiments is further characterized in that a monolayer film formed from the resin has a Dart Impact Strength of from 120 to 1000 g/mil (4.7 to 40 g/μm).

In another embodiment, the polyethylene resin according to any of the above embodiments is further characterized in that a monolayer film formed from the resin has a Dart Impact Strength of from 120 to 800 g/mil (4.7 to 32 g/μm).

In another embodiment, the polyethylene resin according to any of the above embodiments is further characterized in that a monolayer film formed from the resin has a Dart Impact Strength of from 150 to 1000 g/mil (5.9 to 40 g/μm).

In another embodiment, the polyethylene resin according to any of the above embodiments is further characterized in that a monolayer film formed from the resin has a Dart Impact Strength of from 150 to 800 g/mil (5.9 to 32 g/μm).

In another embodiment, the polyethylene resin according to any of the above embodiments is further characterized in that a monolayer film formed from the resin has a relation between the Averaged Modulus M and Dart Impact Strength (D) complying with formula (1a)

$$D \geq 0.8[100 + e^{(11.71 - 0.000268M + 2.183 \times 10^{-9}M^2)}] \tag{1a}$$

where M is expressed in units of psi and D is in units of g/mil, or equivalently, complying with formula (1b)

$$D \geq 0.0315[100 + e^{(11.71 - 0.003887M + 4.592 \times 10^{-5}M^2)}] \tag{1b}$$

where M is expressed in units of MPa and D is in units of g/μm. In both formulae, "e" is the natural logarithm base, 2.718.

6.1.1 Catalysts for Producing Polyethylene Resins

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. In general, a metallocene catalyst precursor can be one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

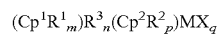

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1_m)R^3_n(Y,R^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Preferred metallocenes are biscyclopentadienyl compounds, preferably bridged by a bridging group including a single carbon, germanium or silicon atom.

Illustrative, but not limiting, examples of suitable biscyclopentadienyl metallocenes of the type described in group (1) above are the racemic isomers of:

μ-$(CH_3)_2$Si(indenyl)$_2$M(Cl)$_2$;
μ-$(CH_3)_2$Si(indenyl)$_2$M(CH_3)$_2$;
μ-$(CH_3)_2$Si(tetrahydroindenyl)$_2$M(Cl)$_2$;
μ-$(CH_3)_2$Si(tetrahydroindenyl)$_2$M(CH_3)$_2$;
μ-$(CH_3)_2$Si(indenyl)$_2$M(CH_2CH_3)$_2$; and
μ-$(C_6H_5)_2$C(indenyl)$_2$M(CH_3)$_2$;
wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-$(C_6H_5)_2$C(cyclopentadienyl)(fluorenyl)M(R)$_2$;
μ-$(C_6H_5)_2$C(3-methylcyclopentadienyl)(fluorenyl)M(R)$_2$;
μ-$(CH_3)_2$C(cyclopentadienyl)(fluorenyl)M(R)$_2$;
μ-$(C_6H_5)_2$C(cyclopentadienyl)(2-methylindenyl)M(CH_3)$_2$;
μ-$(C_6H_5)_2$C(3-methylcyclopentadienyl)(2-methylindenyl)M(Cl)$_2$;
μ-$(C_6H_5)_2$C(cyclopentadienyl)(2,7-dimethylfluorenyl)M(R)$_2$; and
μ-$(CH_3)_2$C(cyclopentadienyl)(2,7-dimethylfluorenyl)M(R)$_2$;
wherein M is Zr or Hf, and R is Cl or $CH_3$.

Examples of monocyclopentadienyl metallocenes of the type described in group (2) above are disclosed in U.S. Pat. Nos. 5,026,798; 5,057,475; 5,350,723; 5,264,405; 5,055,438; and in WO 96/002244.

The metallocene compounds are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. Examples of noncoordinating anions can be found in European Publication EP 277 004.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:
 trialkyl-substituted ammonium salts such as:
 triethylammonium tetraphenylborate;
 tripropylammonium tetraphenylborate;
 tri(n-butyl)ammonium tetraphenylborate;
 trimethylammonium tetrakis(p-tolyl)borate;
 trimethylammonium tetrakis(o-tolyl)borate;
 tributylammonium tetrakis(pentafluorophenyl)borate;
 tripropylammonium tetrakis(o,p-dimethylphenyl)borate;
 tributylammonium tetrakis(m,m-dimethylphenyl)borate;
 tributylammonium tetrakis(p-trifluoromethylphenyl)borate;
 tributylammonium tetrakis(pentafluorophenyl)borate; and
 tri(n-butyl)ammonium tetrakis(o-tolyl)borate;
 N,N-dialkyl anilinium salts such as:
 N,N-dimethylanilinium tetrakis(pentafluorophenyl)borate;
 N,N-dimethylanilinium tetrakis(heptafluoronaphthyl)borate;
 N,N-dimethylanilinium tetrakis(perfluoro-4-biphenyl)borate;
 N,N-dimethylanilinium tetraphenylborate;
 N,N-diethylanilinium tetraphenylborate; and
 N,N-2,4,6-pentamethylanilinium tetraphenylborate;
 dialkyl ammonium salts such as:
 di-(isopropyl)ammonium tetrakis(pentafluorophenyl)borate; and
 dicyclohexylammonium tetraphenylborate; and
 triaryl phosphonium salts such as:
 triphenylphosphonium tetraphenylborate;
 tri(methylphenyl)phosphonium tetraphenylborate; and
 tri(dimethylphenyl)phosphonium tetraphenylborate.

Further examples of suitable anionic precursors include those including a stable carbonium ion, and a compatible non-coordinating anion. These include:
 tropillium tetrakis(pentafluorophenyl)borate;
 triphenylmethylium tetrakis(pentafluorophenyl)borate;
 benzene (diazonium) tetrakis(pentafluorophenyl)borate;
 tropillium phenyltris(pentafluorophenyl)borate;
 triphenylmethylium phenyl-(trispentafluorophenyl)borate;
 benzene (diazonium) phenyl-tris(pentafluorophenyl)borate;
 tropillium tetrakis(2,3,5,6-tetrafluorophenyl)borate;
 triphenylmethylium tetrakis(2,3,5,6-tetrafluorophenyl)borate;
 benzene (diazonium) tetrakis(3,4,5-trifluorophenyl)borate;
 tropillium tetrakis(3,4,5-trifluorophenyl)borate;
 benzene (diazonium) tetrakis(3,4,5-trifluorophenyl)borate;
 tropillium tetrakis(3,4,5-trifluorophenyl)aluminate;
 triphenylmethylium tetrakis(3,4,5-trifluorophenyl)aluminate;
 benzene (diazonium) tetrakis(3,4,5-trifluorophenyl)aluminate;
 tropillium tetrakis(1,2,2-trifluoroethenyl)borate;
 triphenylmethylium tetrakis(1,2,2-trifluoroethenyl)borate;
 benzene (diazonium) tetrakis(1,2,2-trifluoroethenyl)borate;
 tropillium tetrakis(2,3,4,5-tetrafluorophenyl)borate;
 triphenylmethylium tetrakis(2,3,4,5-tetrafluorophenyl)borate; and
 benzene (diazonium) tetrakis(2,3,4,5-tetrafluorophenyl)borate.

Where the metal ligands include halide moieties, for example, (methylphenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for alkylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R-Al-O)_n$, which is a cyclic compound, or $R(R-Al-O)_n AlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst.

Preferably, no scavenging compounds are used, and the reaction is carried out under conditions of substantially no scavengers. The terms "substantially no scavengers" and "substantial devoid or free of Lewis acid scavengers" as used herein indicate less than 100 ppm by weight of such scavengers present in the feed gas to the reactor, or preferably, no intentionally added scavenger, e.g., an aluminum alkyl scavenger, other than that which may be present on the support.

Preferably the catalyst is substantially devoid of non-bridged metallocene compounds; i.e., no such metallocene is intentionally added to the catalyst, or preferably, no such metallocene can be identified in such catalyst. Preferred catalysts are a compounds including a pair of pi bonded ligands (such as cyclopentadienyl ligands) at least one of which has a structure with at least two cyclic fused rings, such as indenyl rings. In a particular embodiment, the metallocene is a substantially single metallocene species including a monoatom silicon bridge connecting two polynuclear ligands pi bonded to the transition metal atom. A particular example of such a bridged metallocene compound is dimethylsilyl-bis-(tetrahydroindenyl) zirconium dichloride, also denoted as $(CH_3)_2Si(H_4Ind)_2ZrCl_2$, where the term "$H_4Ind$" indicates a tetrahydroindenyl group.

The catalyst is preferably supported on silica with the catalyst homogeneously distributed in the silica pores. Preferably, fairly small amounts of methyl alumoxane should be used, such as amounts giving an Al to transition metal molar ratio of from 400 to 30 or from 200 to 50.

6.1.2 Processes for Producing Polyethylene Resins

Suitable processes for producing polyethylene resins are well known in the art. A preferred process is a steady-state polymerization process, such as in a gas-phase fluidized-bed reactor.

Gas phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of pre-formed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid. The fluidized bed includes a bed of growing polymer particles, polymer product particles and catalyst particles. This reaction mixture is maintained in a fluidized condition by the continuous upward flow from the base of the reactor of a fluidizing gas which includes recycle gas drawn from the top of the reactor, together with added make-up monomer.

The fluidizing gas enters the bottom of the reactor and is passed, preferably through a fluidization grid, upwardly through the fluidized bed.

The polymerization of olefins is an exothermic reaction, and it is therefore necessary to cool the bed to remove the heat of polymerization. In the absence of such cooling, the bed would increase in temperature until, for example, the catalyst became inactive or the polymer particles melted and began to fuse.

In the fluidized-bed polymerization of olefins, a typical method for removing the heat of polymerization is by passing a cooling gas, such as the fluidizing gas, which is at a temperature lower than the desired polymerization temperature, through the fluidized-bed to conduct away the heat of polymerization. The gas is removed from the reactor, cooled by passage through an external heat exchanger and then recycled to the bed.

The temperature of the recycle gas can be adjusted in the heat exchanger to maintain the fluidized-bed at the desired polymerization temperature. In this method of polymerizing alpha olefins, the recycle gas generally includes one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

The material exiting the reactor includes the polyolefin and a recycle stream containing unreacted monomer gases. Following polymerization, the polymer is recovered. If desired, the recycle stream can be compressed and cooled, and mixed with feed components, whereupon a gas phase and a liquid phase are then returned to the reactor.

A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or reactor during the process is referred to generally as a "condensed mode" operation.

Further details of fluidized bed reactors and their operation are disclosed in, for example, U.S. Pat. Nos. 4,243,619, 4,543,399, 5,352,749, 5,436,304, 5,405,922, 5,462,999, and 6,218,484, the disclosures of which are incorporated herein by reference. Suitable process conditions can be determined by one skilled in the art, and are described in PCT publication WO 96/08520 and in U.S. Pat. Nos. 5,763,543 and 6,255,426.

In a specific embodiment, a polyethylene resin is produced by continuously circulating a feed gas stream containing monomer and inerts to thereby fluidize and agitate a bed of polymer particles, adding metallocene catalyst to the bed and removing polymer particles, wherein the catalyst includes at least one bridged bis-cyclopentadienyl transition metal and an alumoxane activator on a common or separate porous support; the feed gas is substantially devoid of a Lewis acidic scavenger and wherein any Lewis acidic scavenger is present in an amount less than 100 wt. ppm of the feed gas; the temperature in the fluidized-bed is no more than 20° C. less than the polymer melting temperature as determined by DSC, at an ethylene partial pressure in excess of 60 psi absolute (410 kPaa); and the removed polymer particles have an ash content of transition metal of less than 500 wt. ppm, the polymer melt index $I_{2.16}$ is less than 10, the MIR is at least 35, and the polymer has substantially no detectable chain end unsaturation as determined by proton nuclear magnetic resonance ($^1$HNMR).

By "substantially no detectable end chain unsaturation" is meant that the polymer has vinyl unsaturation of less than 0.1 vinyl groups per 1000 carbon atoms in the polymer, or less than 0.05 vinyl groups per 1000 carbon atoms, or less than 0.01 vinyl groups per 1000 carbon atoms.

6.1.3 Silane Crosslinking

The polyethylene copolymers are capable of being crosslinked by a reactive unsaturated silane compound. Silane crosslinking processes well-known in the art include the commercially available MONOSIL™ process developed by Maillefer and BICC, and the SIOPLAS™ process developed by Dow Corning. In the SIOPLAS™, or "two-step" process, a polyethylene is first graft-modified in a compounding mixer or extruder with a reactive silane compound and a free radical initiator to produce a silane-grafted polyethylene that can be pelletized and shipped or stored for subsequent processing. The silane-grafted polyethylene is then compounded with a silanol condensation catalyst and melt-extruded in the desired form, such as a pipe or a wire coating layer, followed by curing (crosslinking) by heat and moisture, such as in a water bath or a steam bath. In warm and humid climates, curing can take place under ambient conditions. In the MONOSIL™ or "one-step" process, the polyethylene, reactive silane compound, free radical initiator and silanol condensation catalyst are all fed into an extruder and melt extruded in a desired form, such as a pipe or a wire coating layer, followed by curing by heat and moisture, as in the two-step process.

The reactive silane compound can be an unsaturated silane compound having one or more hydrolyzable groups. Typical reactive silane compounds include an alkenyl group such as vinyl, allyl, isopropenyl, butenyl, cyclohexenyl, or γ-(meth)acryloxy allyl, and a hydrolyzable group such as a hydrocarbyloxy, hydrocarbonyloxy or hydrocarbylamino group. Specific examples of hydrolyzable groups include methoxy, ethoxy, formyloxy, acetoxy, propionyloxy, and alkylamino or acrylamino groups. A suitable reactive silane is vinyl trimethoxysilane, available as SILQUEST™ from OSi Specialties. The amount of silane used is readily determined by one skilled in the art, based on the processing conditions, the specific silane used, and other well known factors. Typical amounts of silane compound are from about 0.5 to about 5 phr, where the unit "phr" denotes parts by weight per hundred parts by weight of the polyethylene resin.

The free radical initiator can be a peroxide or azo compound which decomposes to form peroxyl or azyl radicals at temperatures suitable for polyethylene pelletization, or can be ionizing radiation. Typical peroxides include, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide and tert-butyl peracetate. A suitable azo compound is azobisisobutyl nitrite. A particular peroxide compound is dicumyl peroxide, available commercially as DICUP™R from Hercules. The amount of free radical initiator is readily determined by one skilled in the art, and is typically from about 0.04 to about 0.15 phr.

The silanol condensation catalyst can be any compound that promotes the condensation crosslinking reaction, such as organic bases, carboxylic acids, and organometallic compounds including organic titanates and complexes or carboxylates of lead, cobalt, iron, nickel, zinc or tin. Specific catalysts include, for example, dibutyl tin dilaurate, dioctyl tin maleate, dibutyl tin diacetate, dibutyl tin dioctoate, dibutyl tin didodecanoate, stannous acetate, stannous octoate, lead naphthenate, zinc caprylate, and cobalt naphthenate. A particular tin carboxylate is dibutyl tin didodecanoate, available commercially as STANCLERE™TL from Akzo Chemie. The catalyst is used in a catalytically effective amount, readily determined by one skilled in the art. Typical catalyst amounts are from about 0.01 to about 0.1 phr.

The peroxide-initiated reaction of vinyl trimethoxysilane and polyethylene yields a grafted polymer having a polyethylene backbone structure with pendant ethyltrimethoxysilyl moieties. In the crosslinking reaction, methoxy groups are hydrolyzed to form methanol and pendant ethyldimethoxysilanolyl groups, which undergo condensation reactions with other ethyldimethoxysilanolyl groups to eliminate water and form an Si—O—Si linkage between the pendant silyl moieties.

6.2 Electrical Devices

In one aspect, the invention provides electrical devices including one or more layers formed of or containing any of the silane-crosslinkable, or silane crosslinked, polyethylene compositions described herein. Such devices include, for example, power cables, telecommunications cables or data transmission cables, and combined power/telecommunications cables. As used herein, the terms "telecommunications cable" and "data cable" are used interchangeably. When the electrical device is a power cable, it can be a low voltage cable, i.e., a device adapted to transport electricity at a voltage potential of less than or equal to 1 kV or alternatively less than or equal to 6 kV; a medium voltage cable, i.e., a device adapted to transport electricity at a voltage potential of from a lower limit of greater than 1 kV or greater than 6 kV to an upper limit of less than or equal to 35 kV or less than or equal to 66 kV; or a high voltage cable; i.e., a device adapted to transport electricity at a voltage potential of greater than 35 kV or greater than 66 kV. It should be appreciated that the designations "low voltage", "medium voltage" and "high voltage", as commonly used in the art, sometimes overlap; for example, a 4 kV cable is sometimes termed "low voltage" and sometimes termed "medium voltage." The range of suitable voltages, and in particular the upper voltage limit, can be used alternatively to characterize a power cable without resort to low/medium/high designations.

Although the invention is not so limited, specific embodiments of the invention are illustrated in the Figures as representative power cables. Referring to FIG. 1, a power cable 10 is shown. Cable 10 includes a conductor 12, which is shown as a plurality of conductive strands but alternatively be a solid core conductor. Conductor 12 is surrounded in turn by an inner semiconducting layer 14, an insulating layer 16, an outer semiconducting layer 18, a metallic shield layer 20, and an outer sheath 22. In this embodiment, any one or more of the layers 14, 16, 18 and 22, i.e., any semiconducting layer, insulating layer or outer sheath layer, can be formed of, or include, the silane crosslinkable or silane crosslinked compositions described herein. The cable 10 is particularly suited for transport of electricity at a voltage potential of from greater than 1 kV or greater than 6 kV up to 35 kV or up to 66 kV.

Figure 2:
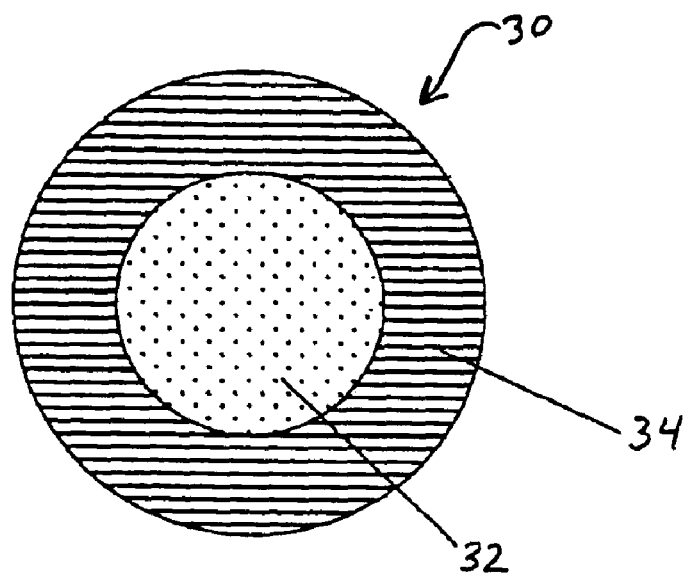
FIG. 2 is a cross-sectional view of an electrical device according to an embodiment of the invention.

Referring now to FIG. 2, an embodiment is shown in cross-section which is particularly suited for transport of electricity at a voltage potential of less than 6 kV or less than 1 kV. Cable 30 includes a conductor 32, which can be a solid core conductor or a plurality of conductive strands; and an outer layer 34 which is formed of or includes a silane crosslinkable or silane crosslinked composition as described herein.

Figure 3:
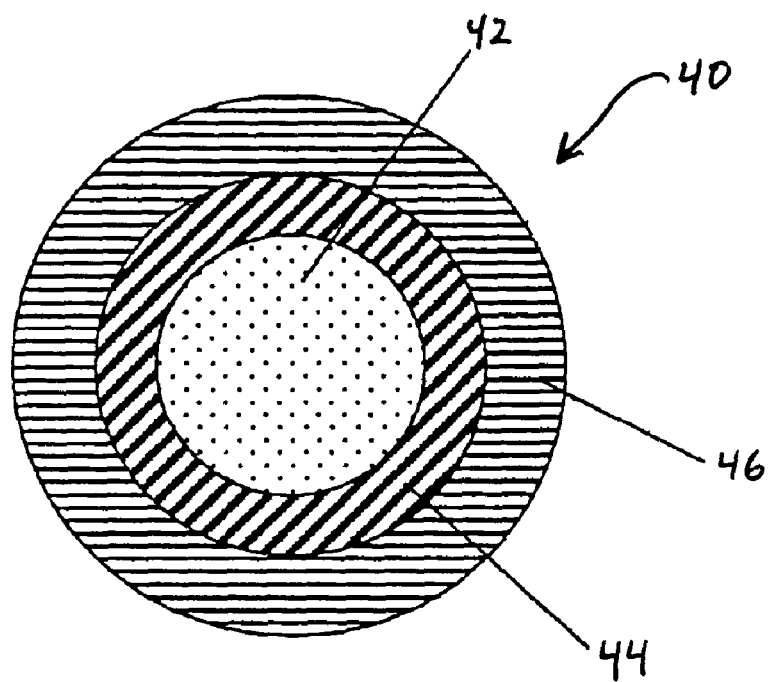
FIG. 3 is a cross-sectional view of an electrical device according to an embodiment of the invention.

Referring to FIG. 3, an embodiment is shown in cross-section which is particularly suited for transport of electricity at a voltage potential of less than 6 kV or less than 1 kV. Cable 40 includes a conductor 42, which can be a solid core conductor or a plurality of conductive strands; an insulating layer 44, and an outer layer 46. One or both of layers 44 and 46 can be formed of or include a silane crosslinkable or silane crosslinked composition as described herein.

Figure 4:
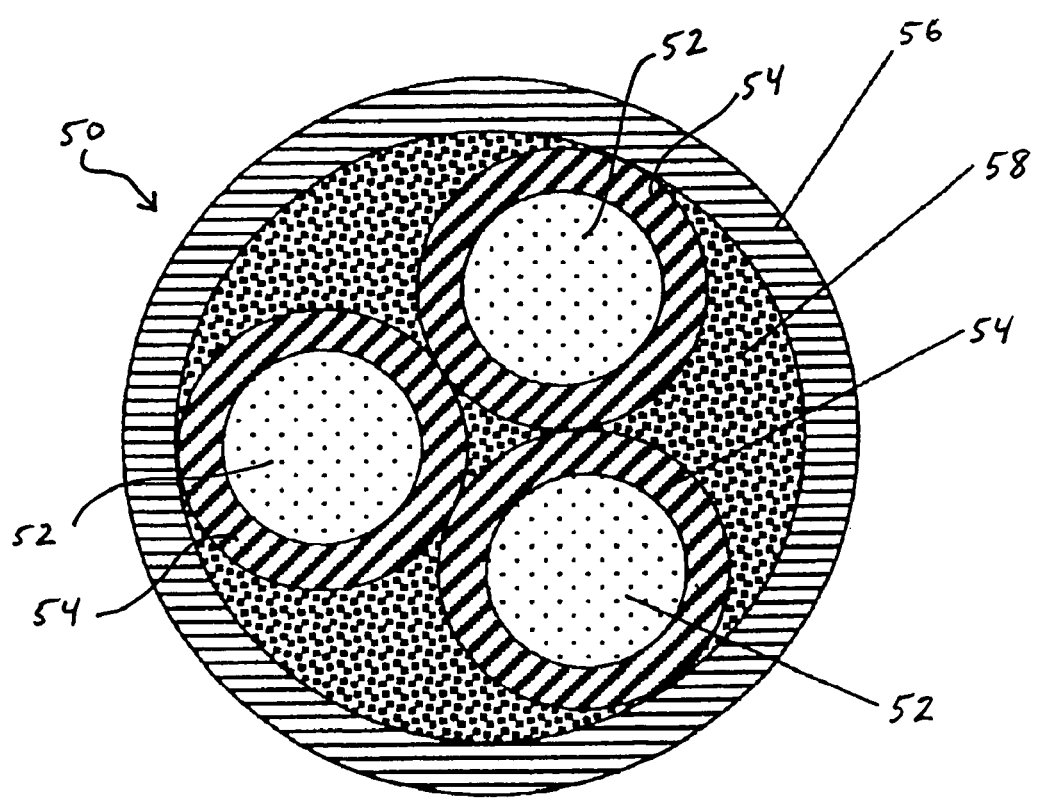
FIG. 4 is a cross-sectional view of an electrical device according to an embodiment of the invention.

Referring to FIG. 4, an embodiment is shown in cross-section which is a low voltage (i.e., less than 6 kV or less than 1 kV) tripolar power transmission cable. Cable 50 includes three conductors 52, which can be solid core conductors or a plurality of conductive strands. Each conductor 52 is surrounded by an insulating layer 54, and the insulated conductors are surrounded by an outer sheath 56. Filler 58 is generally used to fill the interstitial volume. Suitable fillers are well-known in the art. Any one or more of the layers 54 and 56 can be formed of, or include, the silane crosslinkable or silane crosslinked compositions described herein.

It should be appreciated that FIGS. 1–4 show only a few possible embodiments of electrical devices including the silane crosslinkable or silane crosslinked compositions of the invention. The compositions are further suitable for use in other power cable configurations, in telecommunications cables, and in combined power/telecommunications cables.

The conductor can be any suitable electrically conductive material, typically a metal such as copper or aluminum.

In any of the embodiments herein, the silane crosslinkable or silane crosslinked compositions can be essentially the neat resin, or can further include conventional additives, such as antioxidants, fillers, processing co-adjuvants, lubricants, pigments, water-tree retardant additives. Further, polymer blends are also contemplated, such as blends of the crosslinkable or crosslinked ethylene copolymer and polyolefin homopolymers or copolymers, olefin-ester copolymers, polyesters, polyethers, polyether-polyester copolymers and mixtures thereof. Specific examples of polymers that can be included in such polymer mixtures include polyethylenes, polypropylenes, propylene-ethylene thermoplastic copolymers, ethylene-propylene rubbers, ethylene-propylene-diene rubbers, natural rubbers, butyl rubbers, ethylene-vinyl acetate (EVA) copolymers, ethylene-methyl acrylate (EMA) copolymers, ethylene-ethyl acrylate (EEA) copolymers, ethylene-butyl acrylate (EBA) copolymers, and ethylene-alpha-olefin copolymers.

Suitable fillers include inorganic oxides, or inorganic oxides in hydrate or hydroxide form. Examples include oxides or hydroxides of aluminum, bismuth, cobalt, iron, magnesium, titanium and zinc, and the corresponding hydrate forms. Hydroxides are generally used in the form of coated particles, wherein the coating is typically a saturated or unsaturated C8 to C24 fatty acid or a salt thereof, such as, for example, oleic acid, palmitic acid, stearic acid, isostearic acid, lauric acid, magnesium stearate, magnesium oleate, zinc stearate or zinc oleate. Other suitable fillers include glass particles, glass fibers, calcined kaolin and talc.

Typical antioxidants include, for example, polymerized trimethyldihydroquinoline, 4,4'-thiobis(3-methyl-6-tert-butyl)phenol; pentaerythryl-tetra[3-(3,5-ditert-butyl-4-hydroxyphenyl)propionate], and 2,2'-thiodiethylene-bis[3-(3,5-ditertbutyl-4-hydroxyphenyl)propionate].

Typical processing co-adjuvants include, for example, calcium stearate, zinc stearate, stearic acid, and paraffin wax.

Electrical devices described herein can be formed by methods well known in the art, such as by one or more extrusion coating steps in a reactor/extruder equipped with a cable die, and subsequent moisture cure. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

7. EXAMPLES

Materials and Methods

Tensile strength values (tensile yield, ultimate tensile strength, elongation at break and elongation at yield) were measured (machine direction ("MD") and transverse direction ("TD")) in accordance with ASTM D882-97. The film gauge was measured using ASTM D5947-96 Method C, except that the micrometer calibration was performed annually with a commercially available gauge block (Starret Webber 9, JCV1&2).

1% Secant (both MD and TD) was determined in accordance with ASTM D882-97. The film gauge was measured according to ASTM D5947-96 Method C, except that the micrometer calibration was performed annually with a commercially available gauge block (Starret Webber 9, JCV1&2).

Melt Index ($I_{2.16}$), i.e., the melt flow rate at 190° C. under a load of 2.16 kg, was determined according to ASTM D-1238-95, condition E. Melt index $I_{2.16}$ is reported in units of g/10 min, or the numerically equivalent units of dg/min.

Flow Index ($I_{21.6}$), i.e., the melt flow rate at 190° C. under a load of 21.6 kg (sometimes also termed "high load melt index" or "HLMI"), was determined according to ASTM D-1238-95, condition F. Melt index $I_{21.6}$ is reported in units of g/10 min, or the numerically equivalent units of dg/min.

The ratio of two melt flow rates is the "Melt Flow Ratio" or MFR, and is most commonly the ratio of $I_{21.6}/I_{2.16}$ "MFR" can be used generally to indicate a ratio of melt flow rates measured at a higher load (numerator) to a lower load (denominator). As used herein, the term "melt index ratio" or "MIR" refers specifically to the ratio $I_{21.6}/I_{2.16}$. Melt flow ratios are dimensionless.

Density (g/cm$^3$) was determined using chips cut from plaques compression molded in accordance with ASTM D-1928-96 Procedure C, aged in accordance with ASTM D618 Procedure A, and measured according to ASTM D1505-96.

Elmendorf tear was determined in accordance with ASTM D1922-94a. The film gauge was measured according to ASTM D374-94 Method C, except that the micrometer calibration was performed annually with a commercially available gauge block (Starret Webber 9, JCV1&2).

Dart Impact Strength (sometimes termed "dart drop") were measured in accordance with ASTM D1709 Method A, at 26 inches (66 cm).

The film gauge was measured according to ASTM D374-94 Method C, except that the micrometer calibration was performed annually with a commercially available gauge block (Starret Webber 9, JCV1&2).

Hot Set (% elongation) was measured according to IEC 540.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J Poly. Sci., Poly. Phys. Ed.*, vol. 20, p. 441 (1982). To determine CDBI, a solubility distribution curve is first generated for the copolymer. This may be accomplished using data acquired from the TREF technique. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a $Mn \geq 15,000$, where Mn is the number average molecular weight of the fraction. Any low weight fractions present generally represent a trivial portion of the polymer. The remainder of this description and the appended claims maintain this convention of assuming all fractions have $Mn \geq 15,000$ in the CDBI measurement.

As used herein, "molecular weight" indicates any of the moments of the molecular weight distribution, such as the number average, weight average, or Z-average molecular weights, and "molecular weight distribution" indicates the ratio of two such molecular weights. In general, molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. These and higher moments are included in the term "molecular weight." The desired molecular weight distribution (MWD) function (such as, for example, Mw/Mn or Mz/Mw) is the ratio of the corresponding M values. Measurement of M and MWD by conventional methods such as gel permeation chromatography is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

GPC measurements were made on a Waters 150C GPC instrument equipped with a differential refraction index ("DRI") detector. GPC columns are calibrated by running a series of polystyrene standards. Molecular weights of polymers other than polystyrenes are conventionally calculated by using Mark Houwink coefficients for the polymer in question.

Short Chain Branching (SCB) was determined by $^1$HNMR (proton nuclear magnetic resonance) with data collected at 500 MHz. Spectra were referenced by setting the polymer backbone signal to 1.347 ppm. Methyl group contents in ethylene 1-olefin copolymers were calculated from the $^1$HNMR spectrum using the following formula:

Methyl Groups/1000 Carbons=$(I_{CH3}*0.33*1000)/(I_{0.5-2.1\ ppm}*0.5)$ where $I_{CH3}$ is the normalized methyl signal area in the region between 0.88 and 1.05 ppm and $I_{0.5-2.1\ ppm}$ is the area between 0.50 and 2.10 ppm. The number of methyl groups will correspond to the number of short chain branches in the polymer assuming that the short chain branches contain 1 methyl (—CH$_3$) group and that all methyl groups are a result of short chain branching. The same NMR method can be used to determine vinyl end unsaturation.

Granular Bulk Density is determined as follows. Granular polymer particles are poured via a 7/8" (2.2 cm) diameter funnel into a fixed volume cylinder of 400 mL. The bulk density is measured as the weight of resin divided by 400 mL to give a value in g/mL.

Particle Size is measured by determining the weight of material collected on a series of U.S. Standard sieves and determining the weight average particle size in micrometers based on the sieve series used.

Extractability is determined according to FDA regulation 21 CFR 177.1520(d)(3)(ii).

For measurements of film properties, the film samples were annealed by heating for 48 hours at 140° F. (60° C.) prior to testing.

Examples 1–3

Examples 1A and 1B show two examples for preparing catalysts suitable for producing polyethylene copolymers according to the invention. In Examples 2A and 2B, the catalysts of Examples 1A and 1B, respectively, are used to produce two ethylene/hexene copolymer resins, denoted A and B. In Examples 3A and 3B, the properties of the polyethylene resins and unblended monolayer films of the resins are shown. These Examples are also shown in U.S. Pat. No. 6,255,426.

Example 1A

A solution of 1300 mL of 30 wt % alumoxane (MAO) in toluene as determined by reference to the total Al content, which may include unhydrolyzed TMA, was charged to a two gallon (7.57 L), jacketed glass-walled reactor, equipped with a helical ribbon blender and an auger-type shaft. 2080 mL of toluene was added and stirred. A suspension of 31.5 g dimethylsilyl-bis(tetrahydroindenyl) zirconium dichloride (Me$_2$Si(H$_4$Ind)$_2$ZrCl$_2$) in 320 mL of toluene purchased from Albemarle Labs, was cannulated to the reactor. An additional bottle of dry toluene (250 mL) was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (1040 g, Davison MS 948, 1.65 mL/g pore volume) was charged to the reactor. Half of the solution from the 4 L Erlenmeyer flask was then transferred back to the 2 gallon (7.57 L) stirred glass reactor. The reaction temperature rose from 70° F. (21.1° C.) to 100° F. (37.8° C.) in a five minute exotherm. The balance of the solution in the 4 L Erlenmeyer flask was subsequently added back to the glass reactor, and stirred twenty minutes. Then, toluene was added (273 mL, 238 g) to dilute the active catalyst slurry, and stirred an additional twenty-five minutes. Antistat AS-990, a surface modifier made from ethoxylated stearylamine sold by Witco Chemical Corp. (7 g in 73 mL toluene) was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then, five additional hours of drying at 142° F. (61.1° C.) to 152° F. (66.7° C.) and vacuum which ranged from 5 inches to 22 inches Hg (127 to 559 mmHg) were used to dry the support and yield 1709.0 g of free-flowing active supported catalyst material. Head space gas chromatograph (HSGC) measurements showed 13,000 weight parts per million (1.3 wt %) of residual toluene. A second drying step under stronger vacuum conditions, resulted in HSGC analysis measurement of residual toluene at 0.18%. Elemental analysis showed 0.40% Zr, 10.75% Al, 30.89% Si, 0.27% Cl, 9.26% C, 2.05% H (all percentages shown herein are weight percent).

Example 1B

A solution of 1125 mL of 30 wt % alumoxane (MAO) in toluene as determined by reference to the total Al content, which may include unhydrolyzed TMA, was charged to a two gallon (7.57 L), jacketed glass-walled reactor, equipped with a helical ribbon blender and an auger-type shaft. 1800 mL of toluene was added and stirred. A suspension of 30.8 g dimethylsilyl-bis-(tetrahydroindenyl) zirconium dichloride ($Me_2Si(H_4Ind)_2ZrCl_2$) in 320 mL of toluene purchased from Albemarle Labs, was cannulated into the reactor. An additional 150 mL of toluene was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (899 g, Davison MS 948, 1.65 mL/g pore volume) was charged to the reactor. Half of the solution from the 4 L Erlenmeyer flask was then transferred back to the 2 gallon (7.57 L) stirred glass reactor. The reaction temperature rose from 70° F. (21.1° C.) to 100° F. (37.8° C.) in a five minute exotherm. The balance of the solution in the 4 L Erlenmeyer flask was subsequently added back to the glass reactor, and stirred twenty minutes. Then, toluene was added (273 mL, 238 g) to dilute the active catalyst slurry, and stirred an additional twenty-five minutes. Antistat AS-990 was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then, nine and a half additional hours of drying at 142° F. (61.1° C.) to 152° F. (66.7° C.) at a vacuum which ranged from 5 inches to 22 inches Hg (177 to 559 mmHg) were used to dry the support and yield 1291.4 g of free-flowing active supported catalyst material.

Example 2

The catalysts formed in Examples 1A and 1B were used to prepare polyethylene copolymers 2A and 2B, respectively, as follows.

The polymerization was conducted in a continuous gas phase fluidized-bed reactor having a 16.5 inch (41.9 cm) diameter with a bed height of approximately 12 feet (3.6 m). The fluidized-bed is made up of polymer granules. The gaseous feed streams of ethylene and hydrogen together with liquid comonomer were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

Solid catalyst 1A or 1B was injected directly into the fluidized-bed using purified nitrogen as a carrier. Its rate of injection was adjusted to maintain a constant production rate of the polymer. The reacting bed of growing polymer particles is maintained in a fluidized state by the continuous flow of the make-up feed and recycle gas through the reaction zone. A superficial gas velocity of 1–3 ft/s (0.3 to 0.9 m/s) was used to achieve this. The reactor was operated at a total pressure of 300 psig (2068 kPa gauge). To maintain a constant reactor temperature, the temperature of the recycle gas is continuously adjusted up or down to accommodate any changes in the rate of heat generation due to the polymerization.

The fluidized-bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst and cocatalyst.

The polymerization conditions are summarized in Table 1.

TABLE 1

| Polymerization Conditions | 2A | 2B |
|---|---|---|
| Zr (wt %) | 0.43 | 0.50 |
| Al (wt %) | 11.6 | 11.4 |
| Al/Zr (mol/mol) | 91.2 | 77.1 |
| Temperature (° C.) | 79.4 | 85 |
| Pressure (bar) | 21.7 | 21.7 |
| Ethylene (mol %) | 25.0 | 49.9 |
| Hydrogen (mol ppm) | 275 | 445 |
| Hexene (mol %) | 0.23 | 0.32 |

TABLE 1-continued

| Polymerization Conditions | 2A | 2B |
|---|---|---|
| Bed Weight (kg PE) | 113 | 121 |
| Production Rate (kg PE/hr) | 27.6 | 35.5 |
| Catalyst Productivity (kg PE/kg catalyst) | 1690 | 2287 |
| Bulk Density (g/mL) | 0.448 | 0.450 |
| Average Particle Size (μm) | 920 | 803 |
| Ash (ppm) | 507 | 386 |

The parameters in Table 1 were determined as described previously; the Zr, Al weight percent and ash levels were by elemental analysis. No aluminum alkyl compounds were added to the reactor as scavenger. The runs were continued for about 3 days.

Example 3

Resin properties, and properties of monolayer blown films formed from the resins using conventional film blowing equipment are shown in Tables 2–3, wherein "3A" and "3B" correspond to the resin (or film produced from the resin) produced in Examples 2A and 2B, respectively.

TABLE 2

Resin Properties

|  | 3A | 3B |
|---|---|---|
| Density (g/cm³) | 0.9190 | 0.9257 |
| Melt Index $I_{2.16}$ (dg/min) | 1.10 | 0.62 |
| MIR, $I_{21.6}/I_{2.16}$ | 46.0 | 57.6 |
| Mw | 92200 | 104700 |
| Mn | 18300 | 17900 |
| Mz | 208400 | 287500 |
| Mw/Mn | 5.04 | 5.85 |
| 1st Melting Peak (° C.)[a] | 108.6 | 122.6 |
| 2nd Melting Peak (° C.)[a] | 119.3 | 117.3 |
| CDBI (%) | 86 | 83.10 |
| SCB (per 1000 C) | 15.4 | 10.6 |
| C6 (wt %) | 9.3 | 6.4 |
| C6 (mol %) | 3.3 | 2.2 |

[a] note: the sample had been molten and been allowed to cool once previously

TABLE 3

Monolayer Blown Film Properties

|  | 3A | 3B |
|---|---|---|
| Blow-up Ratio | 2.5 | 2.1 |
| Gauge, mil (μm) | 2.1 (53) | 2.0 (51) |
| MD 1% Secant Modulus, psi (N/cm²) | 29420 (20284) | 45070 (31075) |
| TD 1% Secant Modulus, psi (N/cm²) | 31230 (21532) | 47420 (32695) |
| Average Modulus, psi (N/cm²) | 30325 (20908) | 46245 (31885) |
| MD Elmendorf Tear, g/mil | 207 | 134 |
| TD Elmendorf Tear, g/mil | 430 | 477 |
| 26" (66 cm) Dart Impact Strength, g/mil | 410 | 156 |
| Calculated DIS(M) minimum, g/mil[a] | 294 | 123 |
| Haze, % | 10.2 | 9.9 |
| Extractability | 1.0 | not available |

[a] calculated from formula (1a) herein.

Example 4

A larger number of additional further tests were performed with different samples made according to the invention in a similar manner, and the results are shown in Table 4. This example also shown in U.S. Pat. No. 6,255,426.

TABLE 4

| Average Modulus | | Dart Impact Strength (26 inch) | |
|---|---|---|---|
|  |  | Calculated from Formula (1), | Measured, |
| psi | N/cm² | g/mil | g/mil |
| 25,575 | 17,633 | 508 | 611 |
| 28,580 | 19,705 | 353 | 456 |
| 28,990 | 19,987 | 337 | 553 |
| 29,145 | 20,094 | 332 | 451 |
| 30,325 | 20,908 | 294 | 410 |
| 31,450 | 21,684 | 264 | 284 |
| 31,610 | 21,794 | 260 | 257 |
| 32,000 | 22,063 | 251 | 349 |
| 32,140 | 22,159 | 248 | 223 |
| 33,780 | 23,290 | 217 | 251 |
| 34,160 | 23,552 | 211 | 262 |
| 35,170 | 24,248 | 196 | 223 |
| 35,970 | 24,800 | 186 | 261 |
| 37,870 | 26,110 | 167 | 251 |
| 39,325 | 27,113 | 155 | 197 |
| 39,390 | 27,158 | 154 | 193 |
| 43,675 | 30,112 | 131 | 167 |
| 46,245 | 31,884 | 123 | 156 |
| 47,730 | 32,908 | 119 | 147 |
| 49,460 | 34,101 | 115 | 143 |

In the following Examples, various inventive and comparative resins were used to demonstrate particular features and distinctions of processes and compositions of the invention. Resins are designated as follows:

CZN2.8 is a comparative Ziegler-Natta catalyzed linear low density polyethylene resin having a melt index $I_{2.16}$ of 2.8 g/10 min, and a density of 0.918 g/cm³.

CM3.18 is a comparative metallocene-catalyzed linear low density polyethylene resin having a melt index of 3.18 g/10 min and a density of 0.9197 g/cm³.

CM2.31 is a comparative metallocene-catalyzed linear low density polyethylene resin having a melt index of 2.31 g/10 min and a density of 0.9181 g/cm³.

M0.5 is a metallocene catalyzed linear low density polyethylene of the invention having a melt index of 0.5 g/10 min and a density of 0.925 g/cm³.

M0.87 is a metallocene catalyzed linear low density polyethylene of the invention having a melt index of 0.87 g/10 min and a density of 0.924 g/cm³.

M1.0 is a metallocene catalyzed linear low density polyethylene of the invention having a melt index of 1.0 g/10 min and a density of 0.92 g/cm³.

M2.0 is a metallocene catalyzed linear low density polyethylene of the invention having a melt index of 2.0 g/10 min and a density of 0.92 g/cm³.

Further characteristics of these resins are given in Tables 5–6 herein.

TABLE 5

Properties of Comparative Resins

| Resin Property | CZN2.8 | CM3.18 | CM2.31 |
|---|---|---|---|
| Melt Index $I_{2.16}$ (g/10 min) | 2.8 | 3.18 | 2.31 |
| Flow Index $I_{2.16}$ (g/10 min) | 70 | 51.2 | 40 |

TABLE 5-continued

Properties of Comparative Resins

| Resin Property | CZN2.8 | CM3.18 | CM2.31 |
|---|---|---|---|
| Melt Index Ratio $I_{21.6}/I_{2.16}$ | 25 | 16 | 17 |
| Density (g/cm³) | 0.918 | 0.9197 | 0.9181 |
| DSC Characterization | | | |
| 2nd Melting Cycle, Tm (° C.) | — | 105 | 103 |
|  |  | 116 | 115 |
|  |  | 120 | 119 |
| ΔH (J/g) | — | 143 | 130 |
| 1st Crystallization, Tc (° C.) | — | 93 | 93 |
|  |  | 101 | 100 |
| GPC Characterization | | | |
| Mn | — | 37600 | 41300 |
| Mw | — | 79900 | 86800 |
| Mz | — | 128500 | 138500 |
| Mw/Mn | — | 2.13 | 2.1 |
| Mz/Mw | — | 1.61 | 1.6 |
| NMR Characterization | | | |
| # methyl branches/1000 C | 23.36 | 16.4 | 16.7 |
| total # methyl branches/1000 C | 23.51 | 16.9 | 17 |
| # vinyl groups/1000 C | 0.07 | 0.07 | 0.05 |
| # vinylene groups/1000 C | 0.02 | 0.04 | 0.01 |
| # trisubstituted groups/1000 C | 0 | 0.15 | 0.08 |
| # vinylidene groups/1000 C | 0.04 | 0.06 | 0.05 |

TABLE 6

Properties of Inventive Resins

| Resin Property | M0.5 | M0.87 | M1.0 | M2.0 |
|---|---|---|---|---|
| Melt Index $I_{2.16}$ (g/10 min) | 0.5 | 0.87 | 1.0 | 2.0 |
| Flow Index $I_{2.16}$ (g/10 min) |  |  | 40 | 63.9 |
| Melt Index Ratio $I_{21.6}/I_{2.16}$ |  |  | 40 | 33 |
| Density (g/cm³) | 0.925 | 0.924 | 0.92 | 0.92 |
| DSC Characterization | | | | |
| 2nd Melting Cycle, Tm (° C.) |  | 113.9 |  |  |
|  |  | 118.2 |  |  |
| ΔH (J/g) |  | 140.2 |  |  |
| 1st Crystallization, Tc (° C.) |  | 68.9 |  |  |
|  |  | 105.4 |  |  |

TABLE 6-continued

Properties of Inventive Resins

| Resin Property | M0.5 | M0.87 | M1.0 | M2.0 |
|---|---|---|---|---|
| GPC Characterization | | | | |
| Mn |  | 23300 |  |  |
| Mw |  | 104100 |  |  |
| Mz |  | 241900 |  |  |
| Mw/Mn |  | 4.47 |  |  |
| Mz/Mw |  | 2.32 |  |  |
| NMR Characterization | | | | |
| # methyl branches/1000 C |  | 1.14 |  |  |
| total # methyl branches/1000 C |  | 1.51 |  |  |
| # vinyl groups/1000 C | 0.01 | 0 | 0.01 | 0.01 |
| # vinylene groups/1000 C | 0.05 | 0.05 | 0.04 | 0.03 |
| # trisubstituted groups/1000 C | 0.14 | 0.12 | 0.13 | 0.12 |
| # vinylidene groups/1000 C | 0.03 | 0.02 | 0.03 | 0.04 |

Examples 5–6

Inventive and comparative resins were extruded and crosslinked using a one-step MONOSIL™-type crosslinking process. The resins were extruded using a Haake extruder having a die gap of 0.7 mm, a 3:1 screw, a temperature profile in successive extruder zones of 160, 180, 200, 185° C., and a screw speed of 40 rpm. Further details and results are shown in Table 7 for comparative resins, and in Table 8 for inventive resins.

Conventional additives were added to the resins, such as antioxidants, stabilizers, and processing aids. Typical additives were: IRGANOX™ 1076, a phenolic antioxidant available from Ciba Specialty Chemicals; Weston 399, a phosphite stabilizer available from GE Specialty Chemicals; zinc stearate or zinc oxide, as a scavenger/stabilizer; and polyethylene glycol (PEG) as a processing aid.

Silane crosslinking was carried out using SILQUEST™ A-171, a vinyltrimethoxysilane, $C_2H_5Si(OCH_3)_3$, available from OSi Specialties; DICUP™ R, a dicumyl peroxide initiator available from Hercules Beringen B.V.B.A., Beringen, Belgium; and STANCLERE™ TL, a dibutyltin didodecanoate catalyst, $(C_4H_9)_2Sn(OCC_{11}H_{23})_2$, available from Akzo Chemie.

TABLE 7

Laboratory-Scale Extrusion, Comparatives

| Parameter | CZN2.8 | | CM3.18 | | CM2.31 | |
|---|---|---|---|---|---|---|
| $I_{2.16}$, initial (g/10 min) | 2.8 | | 3.18 | | 2.31 | |
| Density, initial (g/cm³) | 0.918 | | 0.9197 | | 0.9181 | |
| Additives (ppm) | | | | | | |
| IRGANOX ™ 1076 | 360 | | 1500 | | 1500 | |
| Weston 399 | 1500 | | 1750 | | 1750 | |
| Zn Stearate | 500 | | 900 (ZnO) | | 900 (ZnO) | |
| PEG | 200 | | 0 | | 0 | |
| Silane Solution | | | | | | |
| (g/100 g polymer) | | | | | | |
| SILQUEST ™ A-171 | 0 | 1.2 | 0 | 1.2 | 0 | 1.2 |
| DICUP ™ R | 0 | 0.1 | 0 | 0.1 | 0 | 0.1 |
| STANCLERE ™ TL | 0 | 0.05 | 0 | 0.05 | 0 | 0.05 |
| Extrusion Conditions | | | | | | |
| Torque (N · m) | 26–27 | 27–28 | 34–36 | 30 | 41–43 | 30–39 |
| Pressure (bar) | 48 | 82–85 | 56–57 | 79–81 | 71 | 95–101 |
| Melt Temperature (° C.) | 189 | 189 | 190 | 190 | 189 | 190 |
|  | 196 | 194 | 196 | 196 | 195 | 195 |
| Output (g/hr) | 1320 | 1184 | 1374 | 1245 | 1360 | 1255 |

TABLE 7-continued

Laboratory-Scale Extrusion, Comparatives

| Parameter | CZN2.8 | CM3.18 | CM2.31 |
|---|---|---|---|
| Hot Set, 80° C. in water, 2 hours (%) | 47.5 | 46 | 37.5 |
| Hot Set, ambient conditions, 30 days (%) | 29.5 | 30 | 28 |

TABLE 8

Laboratory-Scale Extrusion, Inventive

| Parameter | M0.5 | | M0.87 | | M1.0 | | M2.0 | |
|---|---|---|---|---|---|---|---|---|
| $I_{2.16}$, initial (g/10 min) | 0.5 | | 0.87 | | 1.0 | | 2.0 | |
| Density, initial (g/cm³) | 0.925 | | 0.924 | | 0.92 | | 0.92 | |
| Additives (ppm) | | | | | | | | |
| IRGANOX ™ 1076 | 200 | | 200 | | 300 | | 200 | |
| Weston 399 | 800 | | 800 | | 800 | | 800 | |
| Zinc Stearate | 500 | | 500 | | 500 | | 500 | |
| PEG | 200 | | 200 | | 300 | | 200 | |
| Silane Solution (g/100 g polymer) | | | | | | | | |
| SILQUEST ™ A-171 | 0 | 1.2 | 0 | 1.2 | 0 | 1.2 | 0 | 1.2 |
| DICUP ™ R | 0 | 0.1 | 0 | 0.1 | 0 | 0.1 | 0 | 0.1 |
| STANCLERE ™ TL | 0 | 0.05 | 0 | 0.05 | 0 | 0.05 | 0 | 0.05 |
| Extrusion Conditions | | | | | | | | |
| Torque (N · m) | 38–39 | 34–33 | 35–38 | 26–28 | 38–41 | 30 | 25–26 | 23–24 |
| Pressure (bar) | 79 | 91–93 | 68–69 | 81–83 | 58–59 | 69 | 44–45 | 54–55 |
| Melt Temperature (° C.) | 189 | 188 | 190 | 190 | 189 | 189 | 189 | 189 |
|  | 167 | 197 | 196 | 196 | 196 | 196 | 196 | 196 |
| Output (g/hr) | 1390 | 1296 | 1377 | 1240 | 1357 | 1415 | 1415 | 1294 |
| Hot Set, 80° C. in water, 2 hours (%) | | | | 67 | | | | |
| Hot Set, ambient conditions, 30 days (%) | | | | 42 | | | | |

Example 7

The hot set (%) of several resin compounds was measured according to the procedure of IEC 540. The results for 80° C. water and at room temperature are shown in Table 9.

TABLE 9

| | Hot Set % | | | |
|---|---|---|---|---|
| | CZN2.8 | M0.87 | CM3.18 | CM2.31 |
| 80° C. in water Time (hr) | | | | |
| 0.5 | 217.5 | | 260 | 145 |
| 1 | 90 | 160 | 91 | 56 |
| 1.5 | 59 | 94 | 60 | 47.5 |
| 2 | 47.5 | 67 | 46 | 37.5 |
| 4 | 37.5 | 52.5 | 42 | 27.5 |
| 6 | 32.5 | 42.5 | 37.5 | 27.5 |
| At Room Temperature Time (days) | | | | |
| 2 | | | | 330 |
| 6 | 97.5 | 257.5 | 126.5 | 80 |
| 8 | 77.5 | 165 | 95 | 70 |
| 10 | 70 | 175 | 89 | 60 |
| 30 | 29.5 | 42 | 30 | 28 |

Examples 5–7 show that the polymer compositions of the invention can be processed at the same or reduced torque/ pressure as the comparative compositions, even at much lower melt index, resulting in additional advantages in processability, such as higher melt strength, more stable melt temperature, reduced melt fracture, all well balanced with equivalent crosslinking behavior, as shown by the Hot Set values.

These examples also show particular preferred embodiment wherein the compositions can have a hot set value after 2 hours curing in 80° C. of 70% or less, and other particular preferred embodiments wherein the compositions can have a hot set value after 30 days at ambient conditions of 50% or less.

Hot Set (% elogation) can be measured according to IEC 540.

Example 8

The mechanical properties of the silane-grafted polymers of Example 7 after six hours of curing in hot water at 80 C. were measured and compared with the properties of the corresponding ungrafted polymers. The results are shown in Table 10. As shown in the Table, compositions of the invention show greater tensile strength at break versus the comparative Ziegler-Natta LLDPE, which provides greater safety in mechanical properties in the final cable.

TABLE 10

Mechanical Properties

| Parameter | CZN2.8 | M0.87 | CM3.18 | CM2.31 |
|---|---|---|---|---|
| Ungrafted | | | | |
| Tensile at Yield, MPa | 10.6 | 12.2 | 11.5 | 10.2 |
| Elongation at Yield, % | 19.1 | 8.7 | 18.7 | 18.5 |
| Tensile at Break, MPa | 18.4 | 31.6 | 31.4 | 26 |
| Elongation at Break, % | 779 | 692 | 646 | 575 |
| 1% Secant, MPa | 222 | 298 | 241 | 195 |
| Grafted | | | | |
| Tensile at Yield, MPa | 10 | 12.7 | 10.9 | 9.7 |
| Elongation at Yield, % | 19.8 | 20.1 | 19.7 | 18.7 |
| Tensile at Break, MPa | 23.2 | 26.3 | 33 | 24.5 |

TABLE 10-continued

Mechanical Properties

| Parameter | CZN2.8 | M0.87 | CM3.18 | CM2.31 |
|---|---|---|---|---|
| Elongation at Break, % | 499 | 478 | 504 | 444 |
| 1% Secant, MPa | 193 | 254 | 201 | 191 |

Examples 9–10

Industrial scale extrusion and one-step crosslinking were carried out on several resin compounds, as shown in Table 11. The extruder was a Nokia-Maillefer NMB 100-30D extruder with a 15.6 mm die diameter. A temperature profile of 130–150–170–220–230//230–230–230–260° C. was used. The crosslinking was carried out using a silane solution similar to that described in Examples 5–6, except using SILMIX™, a silane crosslinking solution available from Constab/Silix. The results are shown in Table 12.

TABLE 11

Compounds for Industrial-Scale Extrusion

| | CZN2.8 | M1.0 | M2.0 | CM3.18 | CM2.31 |
|---|---|---|---|---|---|
| $I_{2.16}$ (g/10 min) | 2.8 | 1.0 | 1.96 | 3.2 | 2.3 |
| $I_{21.6}$ (g/10 min) | 70 | 40 | 63.9 | 51.2 | 40 |
| $I_{21.6}/I_{2.16}$ | 25 | 40 | 32.6 | 16 | 17 |
| Density (g/cm$^3$) | 0.918 | 0.920 | 0.921 | 0.9197 | 0.918 |
| Additives (ppm) | | | | | |
| IRGANOX™ 1076 | 360 | 300 | 200 | 1500 | 1500 |
| Weston 399 | 1500 | 800 | 800 | 1750 | 1750 |
| Zinc Stearate | 500 | 500 | 500 | 0 | 0 |
| Zinc Oxide | 0 | 0 | 0 | 900 | 900 |
| PEG | 200 | 300 | 300 | 0 | 0 |

TABLE 12

Industrial Scale Extrusion

| | | CZN2.8 | | M1.0 | | M2.0 | | CM3.18 | | CM2.31 | |
|---|---|---|---|---|---|---|---|---|---|---|---|
| | rpm | neat | grafted | neat | Grafted | neat | grafted | neat | grafted | neat | grafted |
| Output (kg/hr) | 20 | 39 | 43 | 40 | 46 | 38 | 46 | 43 | 47 | 41 | 45 |
| | 40 | 81 | 89 | 80 | 92 | 78 | 93 | 83 | 94 | 78 | 91 |
| | 60 | 121 | 131 | 119 | 135 | 117 | 136 | 123 | 136 | 116 | 133 |
| Melt T (° C.) | 20 | 217 | 219 | 212 | 217 | 211 | 202 | 215 | 220 | 218 | 220 |
| | 40 | 235 | 236 | 227 | 232 | 225 | 222 | 231 | 234 | 240 | 245 |
| | 60 | 247 | 250 | 243 | 246 | 234 | 231 | 241 | 252 | 258 | 264 |
| Pressure (bar) | 20 | 198 | 240 | 200 | 240 | 171 | 213 | 224 | 255 | 254 | 296 |
| | 40 | 263 | 280 | 280 | 297 | 233 | 279 | 293 | 334 | 324 | 382 |
| | 60 | 293 | 315 | 304 | 332 | 268 | 320 | 329 | 365 | 330 | 412 |
| Power (A) | 20 | 101 | 165 | 99 | 160 | 77 | 150 | 121 | 155 | 121 | 171 |
| | 40 | 138 | 192 | 131 | 187 | 108 | 169 | 153 | 200 | 153 | 203 |
| | 60 | 164 | 202 | 157 | 197 | 127 | 189 | 167 | 203 | 170 | 228 |

Figure 5A:
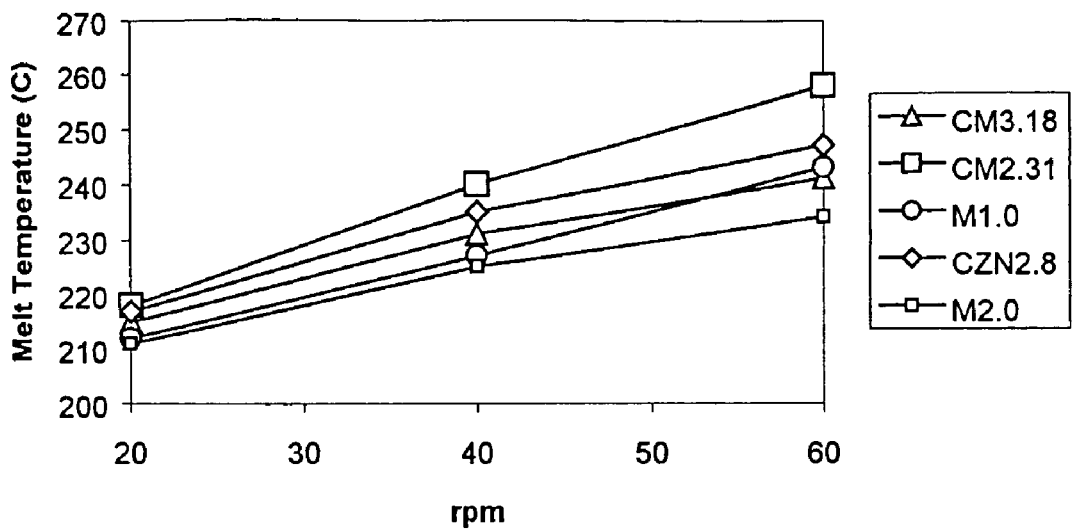
FIGS. 5A and 5B show melt temperature versus extruder rpm for ungrafted and grafted resins, respectively.
Figure 5B:
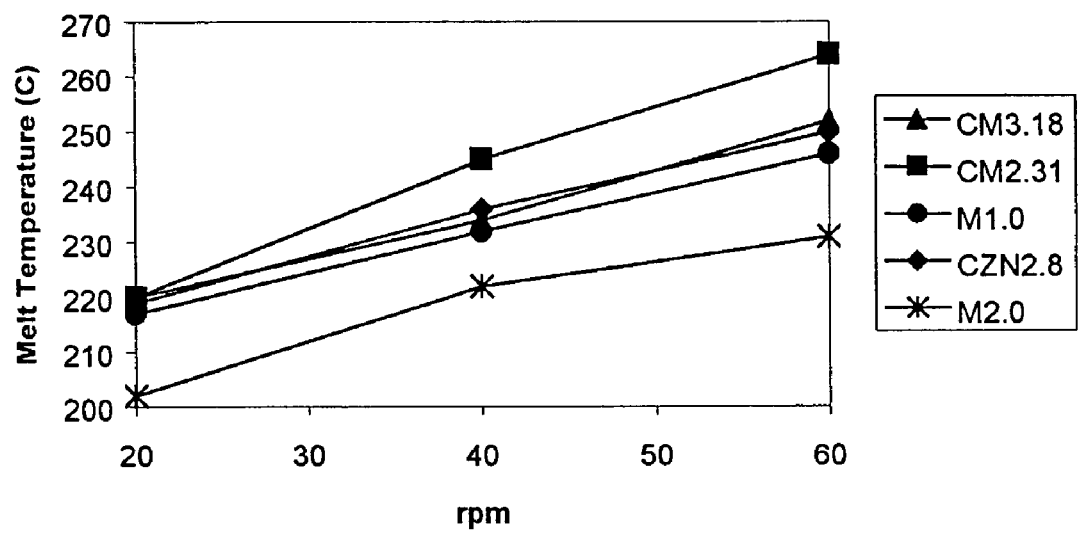
Figure 6A:
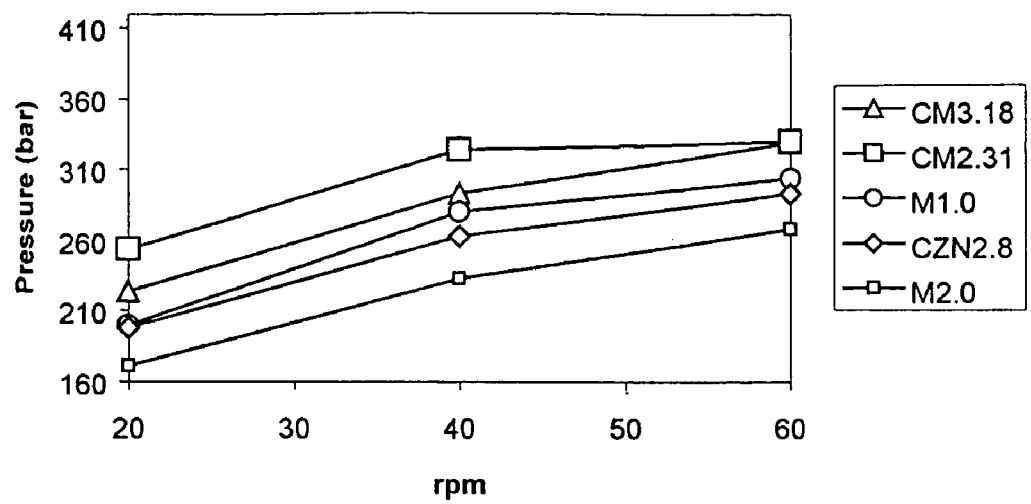
FIGS. 6A and 6B show pressure versus extruder rpm for ungrafted and grafted resins, respectively.
Figure 6B:
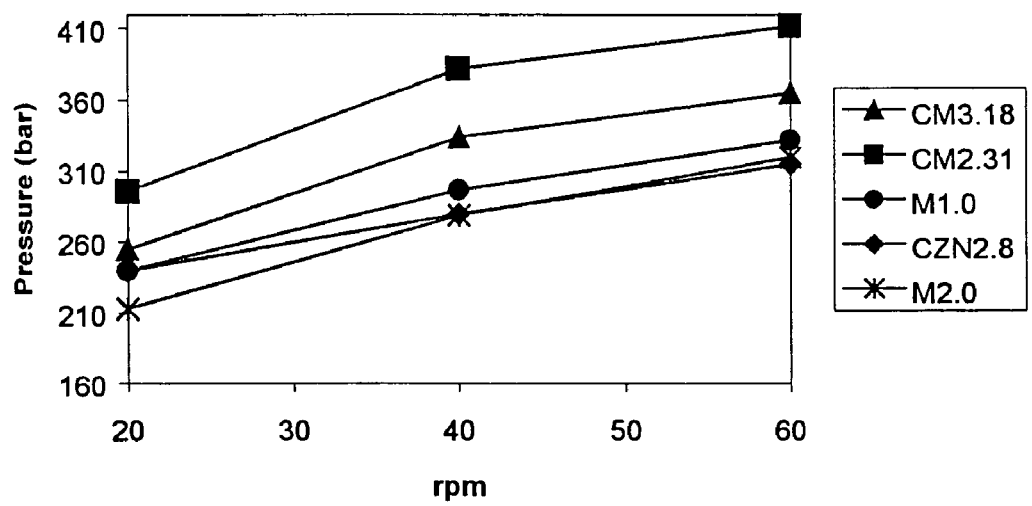

FIGS. 5A and 5B show the data for melt temperature versus rpm graphically for the ungrafted and grafted resins, respectively, of Table 12. FIGS. 6A and 6B show the corresponding pressure data.

Example 11

Figure 7:
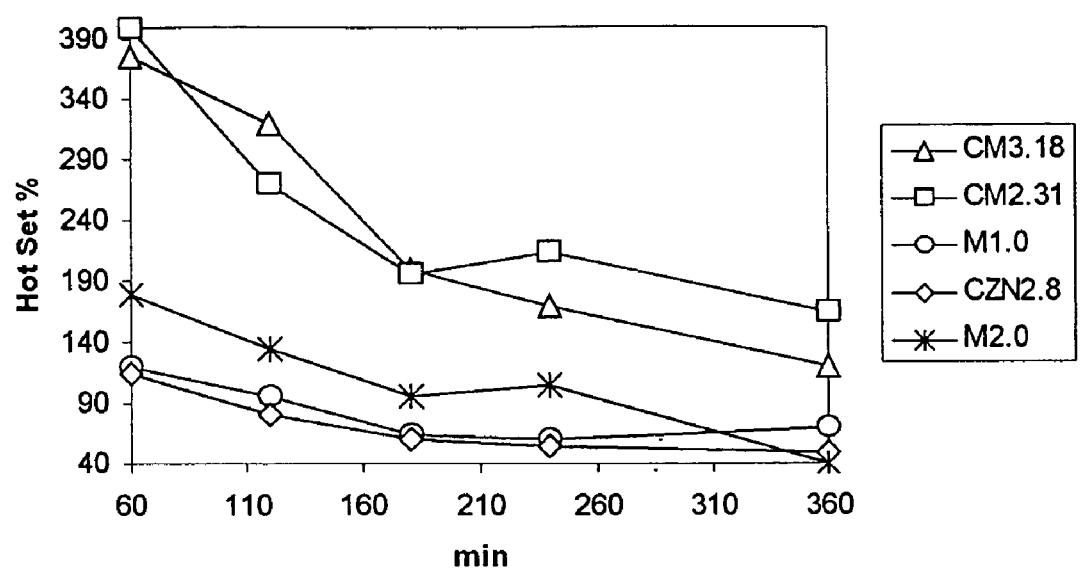
FIG. 7 shows the hot set (% elongation) of silane crosslinked polyethylene resins at 60 rpm.

The hot set (% elongation) of several resin compounds was measured according to the procedure of IEC 540. The results for 80° C. water are shown in Table 13, at rpm values of 20, 40 and 60. The CZN2.8 sample was tested only at 60 rpm. The values for each of the samples at 60 rpm are shown graphically in FIG. 7

TABLE 13

| | | Hot Set %, 80° C. | | | | |
|---|---|---|---|---|---|---|
| rpm | XL Time (min) | CZN2.8 | M1.0 | M2.0 | CM3.18 | CM2.31 |
| 20 | 60 | * | 150 | 205 | 365 | 400 |
| | 120 | * | 115 | 115 | 335 | 330 |
| | 180 | * | 80 | 155 | 260 | 120 |
| | 240 | * | 70 | 100 | 270 | 250 |
| | 360 | * | 60 | 95 | 200 | 185 |
| 40 | 60 | * | 155 | 275 | 400 | 375 |
| | 120 | * | 110 | 190 | 400 | 300 |
| | 180 | * | 70 | 135 | 400 | 170 |
| | 240 | * | 100 | 105 | 315 | 255 |
| | 360 | * | 80 | 100 | 290 | 180 |
| 60 | 60 | 115 | 120 | 180 | 375 | 400 |
| | 120 | 80 | 95 | 135 | 320 | 270 |
| | 180 | 60 | 65 | 95 | 200 | 195 |
| | 240 | 55 | 60 | 105 | 170 | 215 |
| | 360 | 50 | 70 | 40 | 120 | 165 |

The data shown in Table 11 demonstrate the processing advantages achieved through the higher melt index ratios ($I_{21.6}/I_{2.16}$) of the inventive compositions. Table 12 and FIGS. 5A, 5B, 6A and 6B show that the inventive compositions with much lower melt index give equal or improved processing parameters, such as melt temperature, pressure, output and amperage, versus the comparative compositions. In combination with the hot set values of Table 13, these data illustrate the improved overall balance between processability and crosslinking speed that are achieved using the inventive compositions.

Having thus described the invention in detail with particular reference to examples and various embodiments, without intending to limit the invention, the following are the preferred embodiments: a polymer composition, comprising: (a) a copolymer comprising polymerized ethylene monomer and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm³, a melt index ratio $I_{21.6}/I_{2.16}$ of from 30 to 80, and an Mw/Mn ratio of from 2.5 to 5.5; and (b) a silane grafting composition comprising a silane compound and a free radical initiator, the silane compound comprising an unsaturated group and a hydrolyzable group; or reaction products thereof, or the aforementioned and also the following more preferred embodiments, alone or in combination with other more preferred embodiments as would be apparent to one of skill in the art in possession of the present disclosure: wherein the alpha-olefin comonomer comprises 1-butene, 1-hexene or 1-octene; wherein the CDBI of the ethylene copolymer is at least 75%; wherein the CDBI of the ethylene copolymer is at least 80%; wherein the melt index of the ethylene copolymer is from 0.3 to 10 g/10 min; wherein the density of the ethylene copolymer is from 0.916 to 0.935 g/cm³; wherein the melt index ratio $I_{21.6}/I_{2.16}$ of the ethylene copolymer is from 35 to 80; wherein the Mw/Mn ratio is from 2.8 to 4.5; wherein the unsaturated group of the silane compound comprises a vinyl, allyl, isopropenyl, butenyl, cyclohexenyl, or γ-(meth)acryloxy allyl group; wherein the hydrolyzable group of the silane compound comprises a hydrocarbyloxy, hydrocarbonyloxy or hydrocarbylamino group; wherein the silane compound is a vinyl trialkoxysilane and the free radical initiator is an organic peroxide; the composition further comprising a silanol condensation catalyst; wherein the composition has a hot set value after 2 hours curing in 80° C. water of 70% or less; wherein the composition has a hot set value after 30 days of 50% or less; also an embodiment of a silane crosslinked polymer composition, comprising the reaction product of: (a) a copolymer comprising polymerized ethylene monomer and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm³, a melt index ratio $I_{21.6}/I_{2.16}$ of from 30 to 80, and an Mw/Mn ratio of from 2.5 to 5.5; (b) a silane grafting composition comprising a silane compound and a free radical initiator, the silane compound comprising an unsaturated group and a hydrolyzable group; and (c) a silanol condensation catalyst; and the aforementioned and also the following more preferred embodiments, alone or in combination with other more preferred embodiments as would be apparent to one of skill in the art in possession of the present disclosure: wherein the alpha-olefin comonomer comprises 1-butene, 1-hexene or 1-octene; wherein the CDBI of the ethylene copolymer is at least 75%; wherein the CDBI of the ethylene copolymer is at least 80%; wherein the melt index of the ethylene copolymer is from 0.3 to 10 g/10 min; wherein the density of the ethylene copolymer is from 0.916 to 0.935 g/cm³; wherein the melt index ratio $I_{21.6}/I_{2.16}$ of the ethylene copolymer is from 35 to 80; wherein the Mw/Mn ratio is from 2.8 to 4.5; wherein the unsaturated group of the silane compound comprises a vinyl, allyl, isopropenyl, butenyl, cyclohexenyl, or γ-(meth)acryloxy allyl group; wherein the hydrolyzable group of the silane compound comprises a hydrocarbyloxy, hydrocarbonyloxy or hydrocarbylamino group; wherein the silane compound is a vinyl trialkoxysilane and the free radical initiator is an organic peroxide; and also an embodiment of an electrical device comprising the aforementioned polymer composition including the preferred and more preferred embodiments; and also an embodiment of an electrical device comprising: (a) an electrical conductor; and (b) a layer surrounding at least a portion of the electrical conductor, the layer comprising the reaction product of: (i) a copolymer comprising polymerized ethylene monomer and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm³, a melt index ratio $I_{21.6}/I_{2.16}$ of from 30 to 80, and an Mw/Mn ratio of from 2.5 to 5.5; and (ii) a silane grafting composition comprising a silane compound and a free radical initiator, the silane compound comprising an unsaturated group and a hydrolyzable group; and (iii) a silanol condensation catalyst; and the aforementioned and the following more preferred embodiments, alone or in combination with other more preferred embodiments as would be apparent to one of skill in the art in possession of the present disclosure: wherein the layer surrounding at least a portion of the conductor is an insulating layer; wherein the layer surrounding at least a portion of the conductor is a semiconducting layer; wherein the layer surrounding at least a portion of the conductor is an outer jacket layer; wherein the device is a power cable adapted to transport electricity at a voltage potential of less than or equal to 66 kV; wherein the device is a power cable adapted to transport electricity at a voltage potential of less than or equal to 35 kV; wherein the device is a power cable adapted to transport electricity at a voltage potential of less than or equal to 6 kV; wherein the device is a power cable adapted to transport electricity at a voltage potential of less than or equal to 1 kV; wherein the device is a telecommunications cable; wherein the device is a combined power/telecommunications cable;

All patents, test procedures, and other documents cited herein, including priority documents, are fully incorporated by reference to the extent such disclosure is not inconsistent with this invention and for all jurisdictions in which such incorporation is permitted.

What is claimed is:

1. A coating layer for an electrical device comprising:
    (a) a copolymer comprising polymerized ethylene monomer and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm³, a melt index ratio $I_{21.6}/I_{2.16}$ of from 30 to 80, and an Mw/Mn ratio of from 2.5 to 5.5;
    (b) a silane grafting composition comprising a silane compound and a free radical initiator, the silane compound comprising an unsaturated group and a hydrolyzable group; and
    (c) a silanol condensation catalyst;
    or reaction products thereof.

2. The coating layer of claim 1, wherein the alpha-olefin comonomer comprises 1-butene, 1-hexene or 1-octene.

3. The coating layer of claim 1, wherein the CDBI of the ethylene copolymer is at least 75%.

4. The coating layer of claim 1, wherein the CDBI of the ethylene copolymer is at least 80%.

5. The coating layer of claim 1, wherein the melt index of the ethylene copolymer is from 0.3 to 10 g/10 min.

6. The coating layer of claim 1, wherein the density of the ethylene copolymer is from 0.916 to 0.935 g/cm₃.

7. The coating layer of claim 1, wherein the melt index ratio $I_{21.6}/I_{2.16}$ of the ethylene copolymer is from 35 to 80.

8. The coating layer of claim 1, wherein the Mw/Mn ratio is from 2.8 to 4.5.

9. The coating layer of claim 1, wherein the unsaturated group of the silane compound comprises a vinyl, allyl, isopropenyl, butenyl, cyclohexenyl, or γ-(meth)acryloxy allyl group.

10. The coating layer of claim 1, wherein the hydrolyzable group of the silane compound comprises a hydrocarbyloxy, hydrocarbonyloxy or hydrocarbylamino group.

11. The coating layer of claim 1, wherein the silane compound is a vinyl trialkoxysilane and the free radical initiator is an organic peroxide.

12. The coating layer of claim 1, wherein the layer has a hot set value after 2 hours curing in 80° C. water of 70% or less.

13. The coating layer of claim 1, wherein the layer has a hot set value after 30 days of 50% or less.

14. An electrical device comprising:
    (a) an electrical conductor; and
    (b) at least one layer surrounding at least a portion of the electrical conductor, the at least one layer comprising:
        (a) a copolymer comprising polymerized ethylene monomer and $C_3$ to $C_{12}$ alpha-olefin comonomer, the copolymer having a CDBI of at least 70%, a melt index $I_{2.16}$ of from 0.1 to 15 g/10 min, a density of from 0.910 to 0.940 g/cm₃, a melt index ratio $I_{21.6}/I_{2.16}$ of from 30 to 80, and an Mw/Mn ratio of from 2.5 to 5.5;
        (b) a silane grafting composition comprising a silane compound and a free radical initiator, the silane compound comprising an unsaturated group and a hydrolyzable group; and
        (c) a silanol condensation catalyst;
        or reaction products thereof.

15. The electrical device of claim 14, wherein the alpha-olefin comonomer comprises 1-butene, 1-hexene or 1-octene.

16. The electrical device of claim 14, wherein the CDBI of the ethylene copolymer is at least 75%.

17. The electrical device of claim 14, wherein the CDBI of the ethylene copolymer is at least 80%.

18. The electrical device of claim 14, wherein the melt index of the ethylene copolymer is from 0.3 to 10 g/10 min.

19. The electrical device of claim 14, wherein the density of the ethylene copolymer is from 0.916 to 0.935 g/cm³.

20. The electrical device of claim 14, wherein the melt index ratio $I_{21.6}/I_{2.16}$ of the ethylene copolymer is from 35 to 80.

21. The electrical device of claim 14, wherein the Mw/Mn ratio is from 2.8 to 4.5.

22. The electrical device of claim 14, wherein the unsaturated group of the silane compound comprises a vinyl, allyl, isopropenyl, butenyl, cyclohexenyl, or γ-(meth)acryloxy allyl group.

23. The electrical device of claim 14, wherein the hydrolyzable group of the silane compound comprises a hydrocarbyloxy, hydrocarbonyloxy or hydrocarbylamino group.

24. The electrical device of claim 14, wherein the silane compound is a vinyl trialkoxysilane and the free radical initiator is an organic peroxide.

25. The electrical device of claim 14, wherein the at least one layer has a hot set value after 2 hours curing in 80° C. water of 70% or less.

26. The electrical device of claim 14, wherein the at least one layer has a hot set value after 30 days of 50% or less.

27. The electrical device of claim 14, wherein the at least one layer is an insulating layer.

28. The electrical device of claim 14, wherein the at least one layer is a semiconducting layer.

29. The electrical device of claim 14, wherein the at least one layer is an outer jacket layer.

30. The electrical device of claim 14, wherein the device is a power cable adapted to transport electricity at a voltage potential of less than or equal to 66 kV.

31. The electrical device of claim 14, wherein the device is a power cable adapted to transport electricity at a voltage potential of less than or equal to 35 kV.

32. The electrical device of claim 14, wherein the device is a power cable adapted to transport electricity at a voltage potential of less than or equal to 6 kV.

33. The electrical device of claim 14, wherein the device is a power cable adapted to transport electricity at a voltage potential of less than or equal to 1 kV.

34. The electrical device of claim 14, wherein the device is a telecommunications cable.

35. The electrical device of claim 14, wherein the device is a combined power/telecommunications cable.

36. A method for making a coating for an electrical device, comprising:
    polymerizing ethylene monomer and $C_3$ to $C_{12}$ alpha-olefin comonomer to produce a copolymer, the copolymer having a CDBI of at least 70%, a melt index $I_{2.16}$ of from 0.1 to 15 g/10 min, a density of from 0.910 to 0.940 g/cm$_3$, a melt index ratio $I_{21.6}/I_{2.16}$ of from 30 to 80, and an Mw/Mn ratio of from 2.5 to 5.5;

mixing the copolymer with a silane grafting composition comprising a silane compound and a free radical initiator to provide a silane grafted copolymer or reaction products thereof, the silane compound comprising an unsaturated group and a hydrolyzable group;

adding a silanol condensation catalyst to the silane grafter copolymer; and then extruding the copolymer to provide the coating.

37. The method of claim 36, wherein the alpha-olefin comonomer comprises 1-butene, 1-hexene or 1-octene.

38. The method of claim 36, wherein the CDBI of the ethylene copolymer is at least 75%.

39. The method of claim 36, wherein the CDBI of the ethylene copolymer is at least 80%.

40. The method of claim 36, wherein the melt index of the ethylene copolymer is from 0.3 to 10 g/10 min.

41. The method of claim 36, wherein the density of the ethylene copolymer is from 0.916 to 0.935 g/cm$^3$.

42. The method of claim 36, wherein the melt index ratio $I_{21.6}/I_{2.16}$ of the ethylene copolymer is from 35 to 80.

43. The method of claim 36, wherein the Mw/Mn ratio is from 2.8 to 4.5.

44. The method of claim 36, wherein the unsaturated group of the silane compound comprises a vinyl, allyl, isopropenyl, butenyl, cyclohexenyl, or γ-(meth)acryloxy allyl group.

45. The method of claim 36, wherein the hydrolyzable group of the silane compound comprises a hydrocarbyloxy, hydrocarbonyloxy or hydrocarbylamino group.

46. The method of claim 36, wherein the silane compound is a vinyl trialkoxysilane and the free radical initiator is an organic peroxide.

47. The method of claim 36, wherein the coating has a hot set value after 2 hours curing in 80° C. water of 70% or less.

48. The coating of claim 36, wherein the coating has a hot set value after 30 days of 50% or less.

* * * * *